United States Patent [19]
Maekawa

[11] Patent Number: 5,255,064
[45] Date of Patent: * Oct. 19, 1993

[54] DISTANCE-MEASURING EQUIPMENT
[75] Inventor: Hiroko Maekawa, Hyogo, Japan
[73] Assignee: Mitsubishi Denki Kabushiki Kaisha, Tokyo, Japan
[*] Notice: The portion of the term of this patent subsequent to Jul. 12, 2009 has been disclaimed.
[21] Appl. No.: 735,565
[22] Filed: Jul. 25, 1991
[30] Foreign Application Priority Data
  Sep. 3, 1990 [JP] Japan .................. 2-235317
[51] Int. Cl.$^5$ .......... G01C 3/00; G01C 5/00; B60T 7/16
[52] U.S. Cl. .................. 356/1; 354/408; 180/167
[58] Field of Search .......... 354/408; 356/1; 180/167

[56]           References Cited
          U.S. PATENT DOCUMENTS
  3,324,238  6/1967  Stavis .
  3,443,100  5/1969  Fried .
  5,023,712  6/1991  Kajiwara .............. 358/105
  5,131,740  7/1992  Maekawa .............. 356/1
  5,139,327  8/1992  Tanaka ................ 356/1
          FOREIGN PATENT DOCUMENTS
  3302948  7/1983  Fed. Rep. of Germany .
  3445254  3/1985  Fed. Rep. of Germany .
  3735062  4/1989  Fed. Rep. of Germany .
  63-46363  8/1987  Japan .

Primary Examiner—Stephen C. Buczinski
Attorney, Agent, or Firm—Sughrue, Mion, Zinn, Macpeak and Seas

[57]           ABSTRACT

The present invention provides a distance-measuring equipment for measuring the distance from a moving target on the principle of triangulation by electrically detecting the relative dislocations of first and second images focused on the image sensors of paired first and second optical systems through the comparison of image signals respectively provided by the image sensors comprising: a windowing unit for forming a window by selecting specific image signal from either of the image signals stored in the respective memory means, and storing it as a reference image signal in a window memory; and also having a window reforming function for reforming the window at predetermined time intervals, characterized in that a microprocessor compares the reference image signal and another image signal by shifting the latter signal each time for one or more than one bit in accordance with a predetermined shift pattern, and having an interpolation calculating function so as to improve the resolution for detecting the dislocation of the two image signals more precisely and calculating the distance from the moving target. By use of the equipment as constructed above, the time required for calculation can be greatly reduced, yet precision of the distance measurement is improved and thereby reliability thereof can also be improved.

5 Claims, 6 Drawing Sheets

LEFT IMAGE

RIGHT IMAGE

LEFT IMAGE

LEFT IMAGE

RIGHT IMAGE

DISTANCE-MEASURING EQUIPMENT

BACKGROUND OF THE INVENTION

1. Field of the Invention

The present invention relates to a distance-measuring equipment for measuring distance from a moving target such as a running automobile, with use of which the time required for calculation of the distance can be greatly reduced.

2. Description of the Prior Art

Conventionally, various distance-measuring equipments using image sensors have been widely known so far, a case in point being the one disclosed in Japanese Patent Publication No. 63-46363, and one embodiment thereof is described in a block diagram shown in FIG. 6. Referring to FIG. 6, the distance-measuring equipment has a left optical system and a right optical system respectively comprising lenses 1 and 2 disposed with a distance L corresponding to the length of a base line between the respective optical axes thereof, and image sensors 3 and 4 which are disposed at a distance f corresponding to the focal lengths of the lenses 1 and 2 on the optical axes respectively. The image of a target 5 at a distance R from the respective lenses 1 and 2 is focused on the image sensors 3 and 4 respectively by the lenses 1 and 2. Then, the respective image sensors generate image signals. AD converters (analog-to-digital converters) 6 and 7 convert the analog image signals into proportional digital image signals, and memories 8 and 9 store the digital image signals respectively. A microprocessor 10 processes the digital image signals stored in the memories 8 and 9 to determine the distance from the target 5.

In operation, the microprocessor 10 reads a picture element signal a1 representing a picture element at the upper left-hand corner of the image sensor 3 from the memory 8, reads a picture element signal b1 representing a picture element signal at the upper left-hand corner of the image sensor 4 from the memory 9, and then calculates the absolute value C11 of the difference between these two picture element signals a1 and b1 as shown in a formula; $C11 = |a1 - b1|$. Then the microprocessor 10 reads picture element signals a2 and b2 respectively representing picture elements next to the picture elements a1 and b1 at the respective upper left-hand corners of the image sensors 3 and 4, calculates the absolute value C12 of the difference between the picture element signals a2 and b2 as shown in a formula $C12 = |a2 - b2|$, and then adds the thus calculated absolute value C12 to the absolute value C11 obtained in the preceding cycle of calculation. This procedure is repeated sequentially for all the picture elements of the image sensors 3 and 4 to obtain an accumulated value S1 as shown by a formula; $S1 = \Sigma C1i$. Subsequently, the microprocessor 10 reads the picture element signal a1 representing the picture element at the upper left-hand corner of the image sensor 3 from the memory 8, reads a picture element signal b2 representing a picture element next to the picture element b1 at the upper left-hand corner of the image sensor 4, and then calculates the absolute value C21 of the difference between these picture element signals a1 and b2 as shown by a formula; $C21 = |a1 - b2|$. Then microprocessor 10 reads picture element signals a2 and b3 respectively representing picture elements next to the picture elements a1 and b2 of the respective image sensors 3 and 4, and then calculates the absolute value C22 of the difference between these picture element signals a2 and b3 as shown by a formula; $C22 = |a2 - b3|$. This procedure is also repeated sequentially for all the picture elements of the image sensors 3 and 4 to obtain the value S2, which is the accumulated total of the absolute values of the differences, by a formula; $S2 = \Sigma C2i$.

Accordingly, the total sum Si of the absolute value of the differences between the picture element signals of the respective image sensors 3 and 4 can be obtained by repeating the same kind of procedure as above in which the picture element signals of the image sensor 4 to be compared with those of the image sensor 3 are shifted to the right for one picture element at each cycle of comparison procedure. By the way, since the relative dislocation of the right and left images is represented by the minimum value Sj of the above accumulated total value Si, if the minimum value Sj corresponds to the number of picture elements n, then the distance from the target 5 is determined by a formula:

$$R = f \cdot L / n \cdot p \qquad (1)$$

where R is the distance from the target 5, p is the pitch of the picture elements, f is the focal length of the lenses 1 and 2, and L is the distance between the optical axes of the lenses 1 and 2 corresponding to the length of the base line.

Since the conventional distance-measuring equipment is constructed as above, it is able to measure only the distance from a target on its optical axis, and accordingly in measuring the distance from a moving object, the distance-measuring equipment must be turned according to the movement of the moving target so that its optical axis coincides with the target. And further, since the calculation time necessary for comparison of the picture elements obtained from the respective image sensors 3 and 4 throughout the whole picture elements is substantially long, the equipment cannot be adopted for such systems as distance alarm device, an automatic tracking device and so forth, and therefore it is not either practical for a distance-measuring equipment for vehicles.

SUMMARY OF THE INVENTION

Accordingly, it is an object of the present invention to provide a distance-measuring equipment capable of processing image signals in a substantially short time, and therefore capable of being adopted to such systems as a distance alarm device, an automatic tracking device and so forth due to it high reliability.

To achieve the object, the present invention provides, as a first aspect, a distance-measuring equipment for measuring the distance from a moving target on the principle of triangulation by electrically detecting relative dislocations of first and second images comprising: a pair of optical systems for detecting the dislocations disposed at a predetermined distance from each other, the pair of optical systems being composed of pairs of lenses and image sensors on which image of the moving target is focussed and captured through the respective lenses; a pair of memory means for storing image signals which are outputted from the respective image sensors; a windowing unit for forming a window by selecting specific image signal from either of the image signals stored in the respective memory means; another memory means for storing the selected image signal as a reference image signal in the window; a microprocessor which compares the reference image signal and another image signal stored in the image sensor opposite to that of the window-containing side by shifting the latter signal each time for one or more than one bit in accordance with a predetermined shift pattern, having an interpolation calculating function so as to improve the resolution for detecting the dislocation of the two image signals more precisely and calculating the distance from the moving target; and a display unit for displaying the thus calculated distance by the microprocessor. On the other hand, the present invention as a second aspect provides a distance-measuring equipment for measuring the distance from a moving target on the principle of triangulation by electrically detecting relative dislocations of first and second images comprising: a pair of optical systems for detecting the dislocations disposed at a predetermined distance from each other, the pair of optical systems being composed of pairs of lenses and image sensors on which image of the moving target is focussed and captured through the respective lenses; a pair of memory means for storing image signals which are outputted from the respective image sensors; a windowing unit for forming a window by selecting specific image signal from either of the image signals stored in the respective memory means; another memory means for storing the selected image signal as a reference image signal in the window; a microprocessor which compares the reference image signal and another image signal stored in the image sensor opposite to that of the window-containing side by shifting the latter signal each time for one or more than one bit in accordance with a predetermined shift pattern, having an interpolation calculating function so as to improve the resolution for detecting the dislocation of the two image signals more precisely and calculating the distance from the moving target, and also having a window reforming function for reforming the window by comparing the reference image signal and an image signal which is sampled at the next sampling point after a predetermined time lapse; and a display unit for displaying the thus calculated distance by the microprocessor.

The operation of the distance-measuring equipment will be described hereinafter.

First of all, output image signals from the respective image sensors of the paired optical systems are stored in their respective memory means, and then a window is formed by the windowing unit through selecting specific image signal from either of the image signals stored in the respective memory means, which image signal within the thus formed window is stored in the window memory as a reference signal, whereafter the microprocessor first compares the reference image signal and another image signal stored in the image sensor opposite to that of the window-containing side by shifting the latter signal each time for one or more than one bit in accordance with a predetermined shift pattern to calculate the dislocation between these image signals using an interpolation calculating method for obtaining more precise relative dislocation thereof and then to measure the distance from the target using the thus calculated dislocation level. The microprocessor then compares the reference image signal and the image signal sampled at the next sampling point after a predetermined time, and detects a level of the dislocation of these image signals so as to form a new window in accordance with the thus detected dislocation, and then calculates the distance from the target at this moment again using the same interpolation calculating method.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

A distance-measuring equipment in a preferred embodiment according to the present invention is explained referring to the figures as below.

Figure 1:
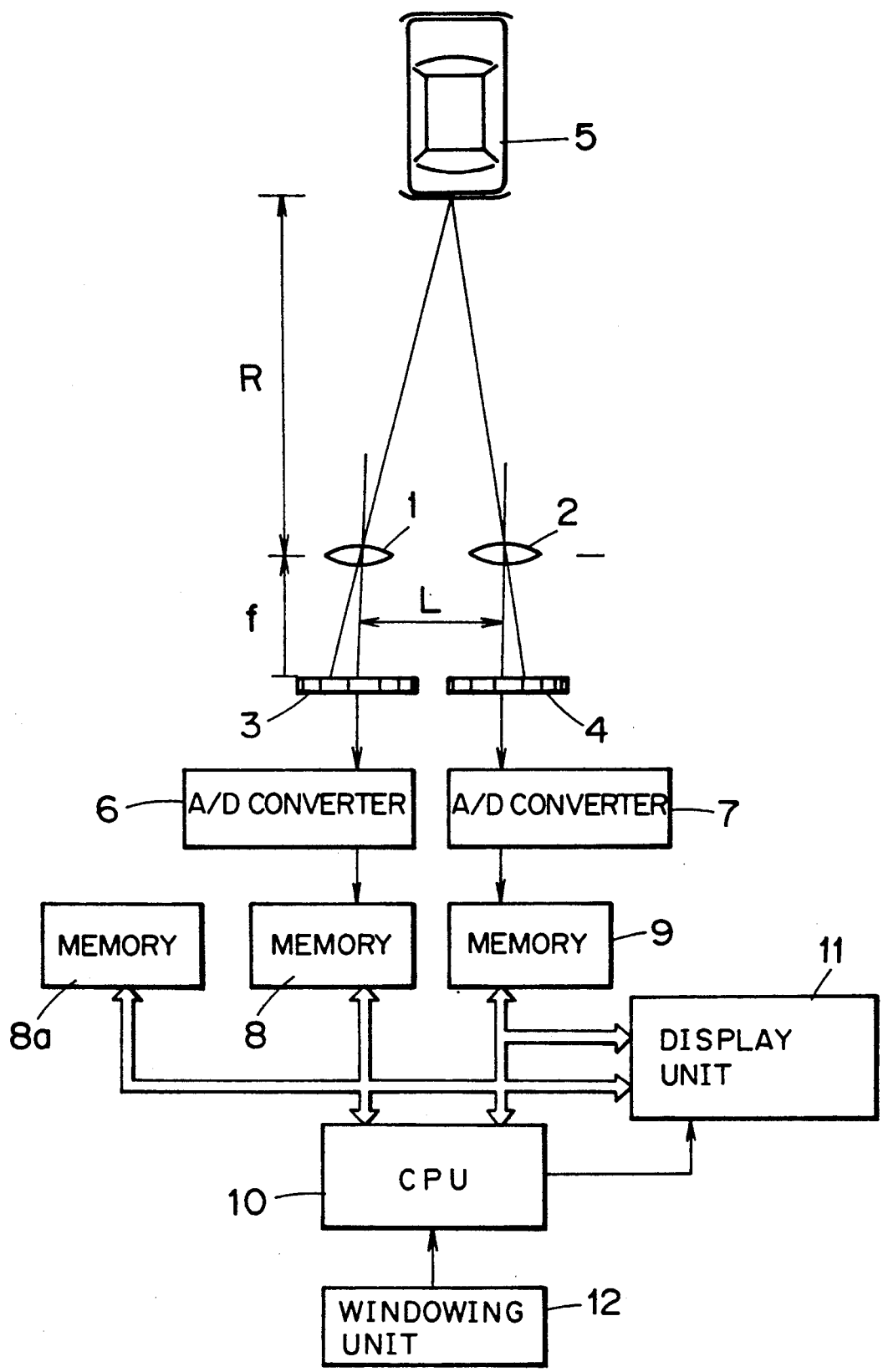
FIG. 1 is a block diagram of a distance-measuring equipment in a preferred embodiment according to the present invention.

FIG. 1 is a block diagram showing one embodiment. In the figure, a pair of optical systems respectively comprising lenses 1 and 2 disposed with a distance L corresponding to the length of the base line is shown. In this type of distance-measuring equipment, an image of the target such as a vehicle running in front is focussed and captured on the two-dimensional image sensors 3 and 4 through the respective lenses 1 and 2, which image sensors 3 and 4 being disposed on the optical axes of the respective lenses 1 and 2, and each comprising a video camera.

The two-dimensional image sensors 3 and 4 are disposed away from the lenses 1 and 2 at a distance f corresponding to the focal lengths of the respective lenses 1 and 2, and a target 5 denotes, in this case, a vehicle which is located at a distance R from the respective lenses 1 and 2.

The outputted analog image signals from the two-dimensional image sensors 3 and 4 are converted into digital signals at a predetermined sampling frequency by AD converters (analog-digital converters) 6 and 7 and the thus obtained data are stored respectively in the memory means 8 and 9.

The picture element signals stored in the memory means 8 and 9 are sent to a microprocessor 10 and to a display 11 at the same time, whereafter the microprocessor 10 processes the signals sent thereto and then calculates a distance from the target in front on the principle of a triangulation, and the display unit 11 displays the signals sent thereto and the distance calculated by the microprocessor 10.

A windowing unit 12 is a device for a driver to form a window at one area, that is, in a region including the target 5 through a manual switching operation referring to the front view displayed in the display unit 11, and the thus displayed image in the window is processed as a reference image by the microprocessor 10.

By the way, the window can be formed also in the right side in stead of in the left side as shown in this embodiment.

Here, the operation of the distance-measuring equipment constructed as above is explained as follows. The image of the target 5 is captured on both of the two-dimensional image sensors 3 and 4 through respective lenses 1 and 2, and the thus obtained image signals by the two-dimensional image sensors are respectively sent to the AD converters 6 and 7 so as to be converted into digital signals therein, and then stored in the memory means 8 and 9 respectively.

The image signals stored in the respective memory means 8 and 9 are sent to the microprocessor 10 and also to the display unit 11 at the same time, whereafter the microprocessor 10 processes the signals sent thereto and then calculates a distance from the target running in front on the principle of a triangulation, and the display unit 11 displays the signals sent thereto and the distance calculated by the microprocessor 10.

On the other hand, the driver forms a window in a specified area including the image of the target 5 on the display unit 11 referring to the front view through a manual switching operation, and the microprocessor 10 processes the image visibly observed in the thus formed window as a reference image.

The following is a detailed explanation regarding the image processing conducted by the microprocessor 10.

FIG. 2 indicates the area in which a reference image A shown in the window formed in the left side is compared with another image B of the right side.

Figure 2A:
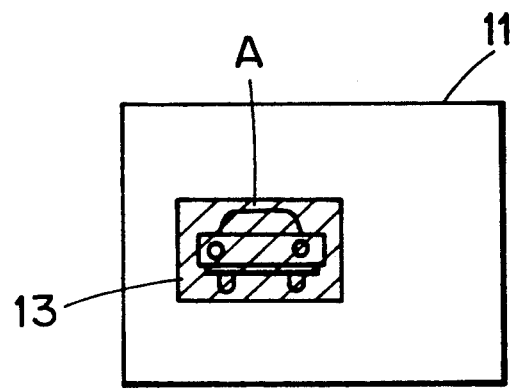
FIGS. 2A and 2B are illustrations respectively explaining the range where the right side image is compared with the reference image existing within the window.
Figure 2B:
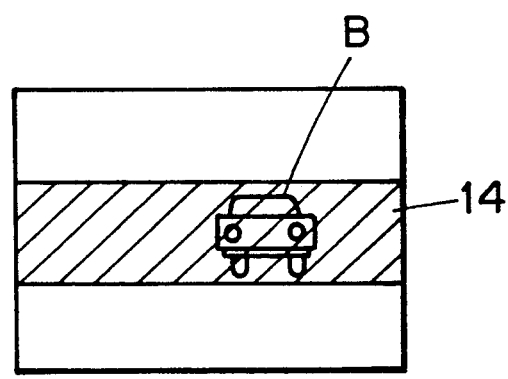

The microprocessor 10 compares the image signal a(i) stored in the memory 8 corresponding to the reference image A within the window which is formed, as shown in FIG. 2A, by a manual switching operation of the driver looking at the display unit 11, and another image signal b(i+j) stored in the memory 9 corresponding to the image B within the comparison area 14, which is shifted, as shown in FIG. 2B, for j bits from the reference image A, and then calculates the total sum of the absolute values of the difference between the picture element signals of the reference image A and those of the image B.

In fact, since the comparison area 14 of the right side is selected by this operation of setting the window of the left side, if only the picture element shift n corresponding to the minimum value of the total sum of the picture element difference signals between the right and left images within the comparison area is obtained, the distance R from the target 5 can be calculated by substituting the picture element pitch p, the reference length L corresponding to the distance between the optical axes of the lenses 1 and 2 and the focal length f of the lenses 1 and 2 in the formula (1) which is explained heretofore, whereby number of picture elements to be compared can be reduced, and the time required for processing is thereby shortened in due course.

A shift pattern used for shifting the right side image B is a function defined between the minimum dislocation level j=0 which can be detected between the left side image and right side image at the measurable maximum distance R1 from the front vehicle and the maximum dislocation level j=p which can be detected between the left side image and right side image at the measurable minimum distance R0 from the front running vehicle, and it is predetermined such that a comparison area 14 of the right side image B which is shifted for one bit or more than one bit can be selected depending on the shift pattern thereof.

In this aspect, since the resolution for distance measuring is proportional to the level of dislocation between a left-side image and a right-side image as shown by the formula (1), if the comparison is performed bit by bit therebetween, a resolution which is of more than a necessary level is spent in a near distance from the target where the relative dislocation level is substantially great.

Figure 4A:
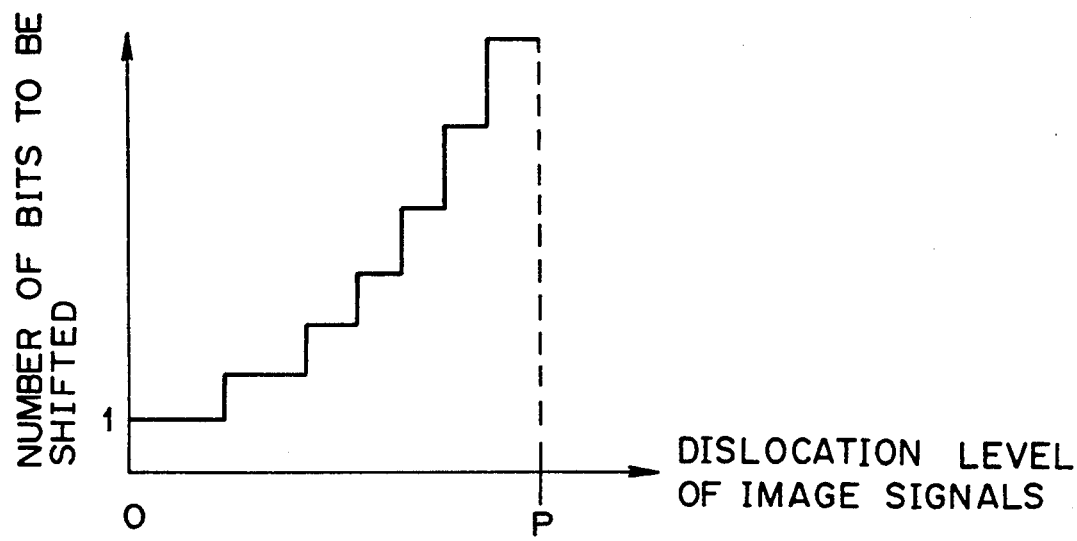
FIGS. 4A and 4B are illustrations respectively explaining various forms of a shift pattern.

Accordingly, a distance-measuring equipment according to the present invention provides an arrangement such that more bits to be shifted are assigned to the measurement of nearer distance, and therefore the time required for calculation is shortened, and as a matter of fact, time for processing is also thereby shortened. Forms of the shifting pattern vary in accordance with the specifications of individual distance-measuring equipments in which required resolution level, the area where the most detailed information regarding the distance from the front vehicle is required and so on are respectively all different. However, in this embodiment, the pattern is predetermined as shown in FIG. 4A such that it varies in a terraced form in proportion to the dislocation level of the images, the reference of which is performed in the following method.

If a relationship between the shift pattern of the Nth cycle of calculation and the dislocation of the image j is represented by S(j), and the comparison area 14 of the image B in the right side is b(i+j), then the dislocation of the (N+1)th cycle of calculation is indicated by b(i+{j+S(j)}), and that of (N+2)th cycle of calculation is indicated by b(i+{j+S(j)+S(j+S(j))}, and so on, and by the similar procedures, the image to be compared in the right side is continuously selected one by one in accordance with the pattern.

Then, from the reference image A within the window 13 and the right-side image selected by the above procedure, the total sum Cj of the absolute value of the difference between the corresponding picture element signals of the respective images is obtained from the following formula; $Cj = \Sigma |a(i) - b(i+j)|$. Here, if the minimum value is represented by Cm, and m is smaller than 2 (m<2), then the number of picture elements n equals to m (n=m), and on the contrary if m is bigger than 2 or equal to 2 (m≧2), then, C(m−1), C(m+1) are calculated to perform interpolating calculation therebetween, and in this case the number of picture elements n equals to m1 which is the interpolated value (n=m1). Once the number of picture elements n which corresponds to the minimum value or interpolated value of the total sum of the picture element difference signals between the right and left images is obtained, the distance R from the target 5 can be calculated by substituting the picture element pitch P, the reference length L corresponding to the distance between the optical axes of the lenses 1 and 2 and the focal length f of the lenses 1 and 2 in the above formula (1).

By the way, the above three-point interpolation calculating method is known in the field of photography and is used here for improving the distance measuring due to the adoption of the shift pattern method, which is explained referring to FIGS. 5A and 5B as shown below.

Figure 5A:
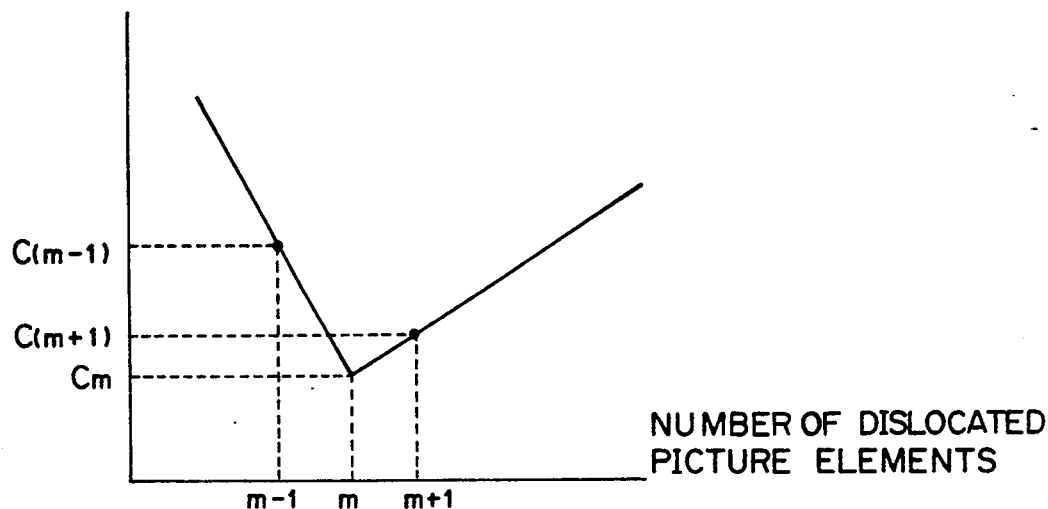
FIGS. 5A and 5B are illustrations of assistance in explaining a three-point interpolation calculating methods.

FIG. 5A shows the case in which C(m−1) is bigger than C(m+1) or equals to C(m+1), and in this case the interpolated value m1 can be obtained by the following formula;

$$m1 = \{C(m-1) - C(m+1)\} / \{2(C(m-1) - Cm)\} \quad (2),$$

Figure 5B:
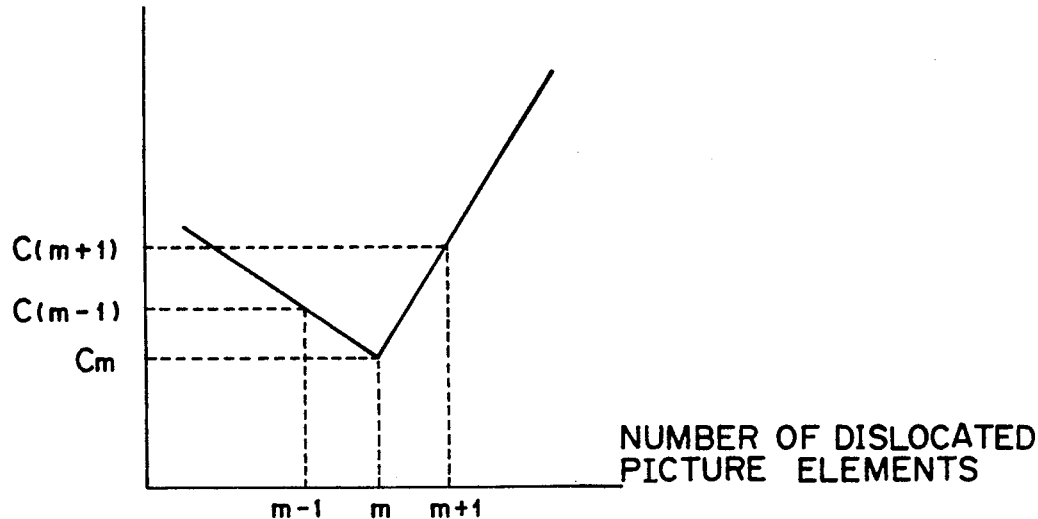
Figure 6:
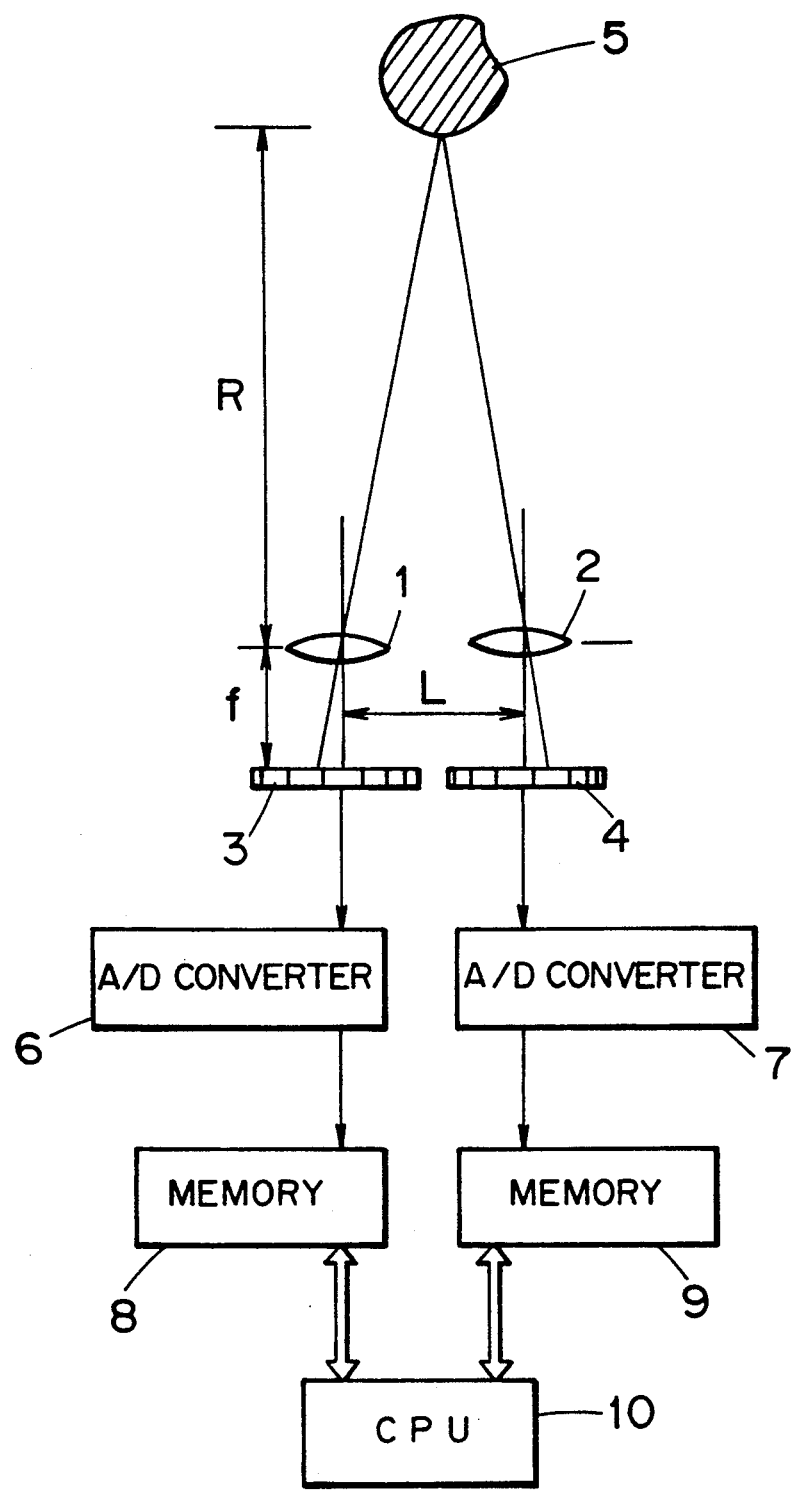
FIG. 6 is a block diagram of a conventional distance-measuring equipment.

On the other hand, FIG. 5B shows the case in which $C(m-1)$ is smaller than $C(m+1)$, and in this case the interpolated value m1 can be obtained by the following formula;

$$m1 = \{C(m-1) - C(m+1)\} / \{2(C(m+1) - Cm)\} \quad (3).$$

Apart from the above described function, the distance measuring equipment according to aspect of the present invention comprises a window reforming function for automatically shifting the window after a predetermined time in accordance with a movement of the target after the calculation of the distance from the target is completed in accordance with above procedure, and once the driver sets the first window, as long as the target exists in the field of vision indicated on the display unit 11, successive automatic calculations of the distance from the target is made possible.

FIG. 3 is an explanatory view showing the window reforming procedure. The window reforming operation is conducted by a procedure in which after the calculation of the distance is completed by the microprocessor 10 in accordance with the above procedure at the time $t=t0$, the image signal a(i) stored in the memory means 8 corresponding to the window 13 of that moment is stored as a reference signal in the memory means 8a which is provided as a window memory.

Figure 3A:
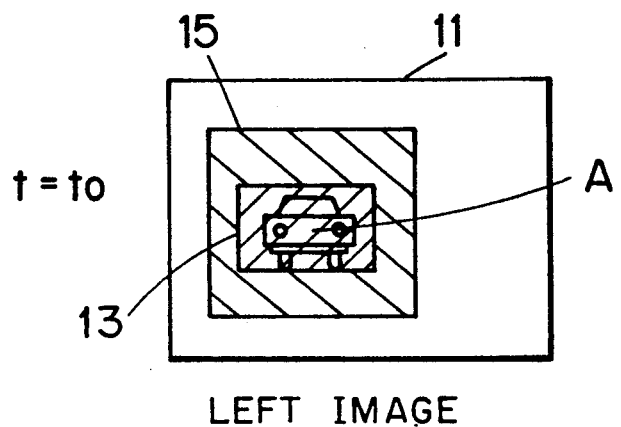
FIGS. 3A, 3B and 3C are illustrations of assistance in explaining a manner of reforming the window.
Figure 3B:
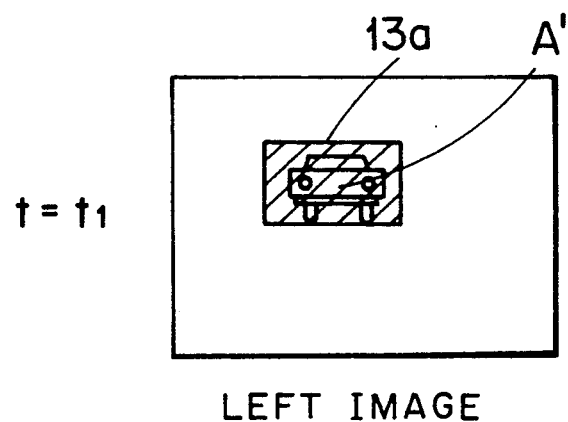
Figure 3C:
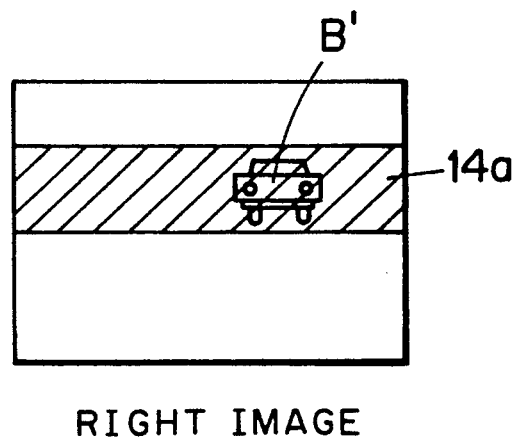

Then, at the time $t1 = t0 + \Delta t$, in other words, at the moment t1 when some $\Delta t$ time has passed from the time t0, an image signal b(j) which is a part of the sampled image signal corresponding to the near area 15 to the window 13 as shown in FIG. 3A and is stored in the memory means 9, the area 15 being predetermined as variable in accordance with the vehicle speed or the like. Whereafter, the image signal b(j) is compared with the image signal a(i) stored in the memory means 8a by the same procedure above in which the whole picture elements in the area 15 are shifted one by one, so that the total sum of the absolute value of difference of respective corresponding image signals is calculated, and then as shown in FIG. 3B, the area 13a containing the image A' where the result of the calculation becomes minimum at the time $t1 = t0 + \Delta t$ is again stored in a form of an image signal in the memory means 8a as a newly formed window, which image signal is regarded as being a new reference image signal at the time point t1 for calculating the distance from the target, and compared with the right side image B' in the comparison area 14a of that time point t1 as shown in FIG. 3C in accordance with the same procedure explained heretofore.

The foregoing actions will be further explained into details as follows.

At the next sampling point t1 a short time after the sampling point t0, the image of the target 5 is focused at a position different from a position where the image of the target 5 was focused at the sampling point t0 because the target 5 is moving. In determining the position of the target 5 at the sampling point t1, the window 13 set at the sampling point t0 as shown in FIG. 3A is used as a reference image signal, the whole image sampled at the sampling point t1 is shifted sequentially as explained heretofore, and the total sum of the absolute values of the differences between the picture elements is calculated in the same way as the calculation conducted in FIGS. 2A and 2B. A region where the total sum is minimum corresponds to the shifted position of the target 5 at the sampling point t1. Then, the window at the sampling point t1 is set as a new window 13a at the sampling point t1 as shown in FIG. 3B. Then, the distance from the target 5 is calculated by processing the output signals of the image sensors 3 and 4 by using the new window 13a. Thus, the distance-measuring equipment according to the present invention is able to measure the distance from the target 5, and to determine the direction and distance of movement of the target 5 by tracking the moving target 5.

In this embodiment as shown above, by setting the image signal in the window as a reference signal, number of picture elements to be compared at the specified moment is reduced, and by adopting the shift pattern method, number of the picture elements to be used for comparison of the images is further reduced, so that the time to be required for processing is greatly reduced as a whole.

Besides, since reduction of the resolution caused due to the reduction of the number of the picture elements to be compared can be avoided by the above interpolation calculation method, distance measuring of high precision can be obtained.

Further, when the driver forms a window using the windowing device 12, as long as the target 5 is within its field of vision after the target has been caught in the field of vision, location of the window automatically moves in accordance with the movement of the target due to the window reforming function, and therefore, once the first window is formed, then the distance from the target is automatically and continuously obtained afterwards.

Although a pair of optical systems are horizontally disposed in this embodiment, a window can be set on at least a pair of vertically disposed video cameras which are composed of lenses 1 and 2, and respective two-dimensional image sensors 3 and 4.

By the way, distance is measured by the three-point interpolation calculation method defined by the above formula (2) and (3) in the above embodiment, but other types of interpolation calculation method can also be employed as long as the interpolation of high precision is obtained.

Figure 4B:
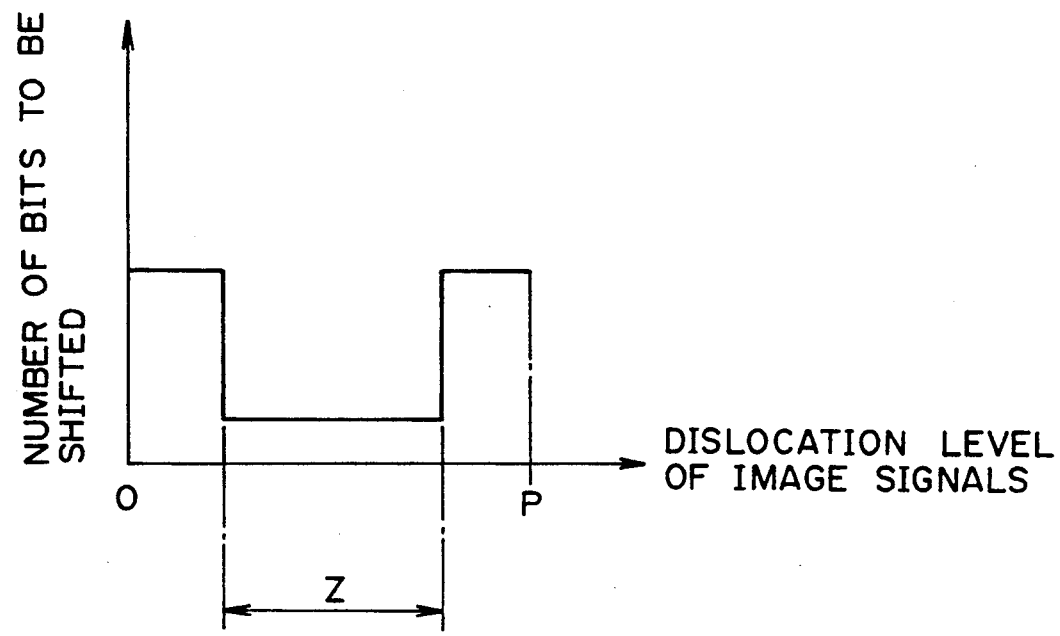

Furthermore, the shift pattern can freely be set as long as it complies with the specification required for a distance-measuring equipment. For example, in the case that only the precision concerning the range Z near the center area in the measurement operable range is required, a pattern as shown in FIG. 4B can be employed.

Effect of the Invention

As described in the embodiment heretofore, since the area set by the driver referring to image displayed on the display unit is defined as a reference image, and the window of the reference image is reformed at each sampling time to compare the images of that moment using a predetermined shift pattern, the time required for calculation can be greatly reduced compared with the case that the whole picture elements of both sides are compared, and also precision of the distance measurement is improved and thereby reliability thereof can also be improved.

Furthermore, once the window is set, the window automatically shifts its location in accordance with the movement of the target, as long as the target is within its field of vision of the display unit 11, so that it can be employed not only to a distance measuring equipment for measuring the distance from the target, but to a distance alarm system, an automatic tracking system and so on.

Although the invention has been described in its preferred form with a certain degree of particularity, obviously many changes and variations are possible therein. It is therefore to be understood that the invention may be practiced otherwise than as specifically described herein without departing from the spirit and scope thereof.

What is claimed is:

1. A distance-measuring equipment for measuring the distance from a moving target on the principle of triangulation by electrically detecting relative dislocations of first and second images comprising:

a pair of optical systems for detecting the dislocations disposed at a predetermined distance from each other, said pair of optical systems being composed of pairs of lenses and image sensors on which image of the moving target is focussed and captured through said respective lenses;

a pair of memory means for storing image signals which are outputted from said image sensors;

a windowing unit for forming a window by selecting specific image signal from either of said image signals stored in said respective memory means;

another memory means for storing said selected image signal as a reference image signal in said window;

a microprocessor which compares said reference image signal and another image signal by shifting the latter signal each time for one or more than one bit in accordance with a predetermined shift pattern, having an interpolation calculating function so as to improve the resolution for detecting the dislocation of said two image signals more precisely and calculating the distance from the moving target; and a display unit for displaying the thus calculated distance by said microprocessor.

2. A distance-measuring equipment for measuring the distance from a moving target on the principle of triangulation by electrically detecting relative dislocations of first and second images comprising:

a pair of optical systems for detecting the dislocations disposed at a predetermined distance from each other, said pair of optical systems being composed of pairs of lenses and image sensors on which image of the moving target is focussed and captured through said respective lenses;

a pair of memory means for storing image signals which are outputted from said image sensors;

a windowing unit for forming a window by selecting specific image signal from either of said image signals stored in said respective memory means;

another memory means for storing said selected image signal as a reference image signal in said window;

a microprocessor which compares said reference image signal and another image signal by shifting the latter signal each time for one or more than one bit in accordance with a predetermined shift pattern, having an interpolation calculating function so as to improve the resolution for detecting the dislocation of said two image signals more precisely and calculating the distance from the moving target, and also having a window reforming function for reforming said window by comparing said reference image signal and an image signal which is stored sampled at the next sampling point after a predetermined time lapse; and a display unit for displaying the thus calculated distance by said microprocessor.

3. A distance-measuring equipment for measuring the distance from a moving target as defined either in claim 1 or 2, wherein said pair of optical systems are vertically disposed from each other.

4. A distance-measuring equipment for measuring the distance from a moving target as defined either in claim 1 or 2, wherein said pair of optical systems are in an oblique relation from each other.

5. A distance-measuring equipment for measuring the distance from a moving target as defined either in claim 1 or 2, wherein said shift pattern can be variably determined, as long as it complies with the specification required for said equipment.

* * * * *